United States Patent

Matuska

[15] 3,694,851
[45] Oct. 3, 1972

[54] QUICKLY REMOVABLE, RETRACTABLE SNUBBED PIVOT PIN MECHANISM

[72] Inventor: James E. Matuska, 13515 25th N.E., Seattle, Wash. 98125

[22] Filed: Oct. 6, 1970

[21] Appl. No.: 78,584

Related U.S. Application Data

[62] Division of Ser. No. 744,933, July 15, 1968, abandoned.

[52] U.S. Cl. ............................16/49, 16/51, 16/176, 16/82
[51] Int. Cl. ..............................................E05f 3/00
[58] Field of Search............16/49, 51, 52, 66, 70, 65, 16/80, 82, 85, 176; 297/426, 151; 312/327; 298/22 B, 22 C, 22 P, 25; 29/265 WS; 292/175, 287, 49

[56] References Cited

UNITED STATES PATENTS

| | | | |
|---|---|---|---|
| 3,107,122 | 10/1963 | Jacobi | 297/426 |
| 979,190 | 12/1910 | Murphy | 16/70 |
| 3,393,939 | 7/1968 | Jacobi | 297/426 |
| 2,253,398 | 8/1941 | Reifenberg | 16/176 |
| 1,529,235 | 3/1925 | Bechereau | 16/51 |

FOREIGN PATENTS OR APPLICATIONS

| | | | |
|---|---|---|---|
| 1,353,618 | 1/1969 | France | 16/176 |
| 525,496 | 5/1956 | Canada | 298/22 R |
| 617,818 | 2/1961 | Italy | 298/22 R |

*Primary Examiner*—Bobby R. Gay
*Assistant Examiner*—Peter A. Aschenbrenner
*Attorney*—Theron H. Nichols

[57] ABSTRACT

A quickly retractable and snubbing pivot pin mechanism comprising an extendible means, snubbing means, and link nonrotatably and slideably connected to the extendible pin means and pivotally connected to the snubbing means. This pin mechanism may be combined with other pivotal structure as a storage bin, such as for aircraft passenger carry-on luggage having the axially retractable pivotal pins extendible from the bin into recesses in support structure, as in an aircraft passenger transport, in a nonrotatable fitting and the snubber pivotally connected between the bin and the pin for snubbing relative movement between the bin and its pivot pin and accordingly between the bin and the support structure.

5 Claims, 5 Drawing Figures

PATENTED OCT 3 1972

INVENTOR.
James E. Matuska
BY
Theron H. Nichols
AGENT

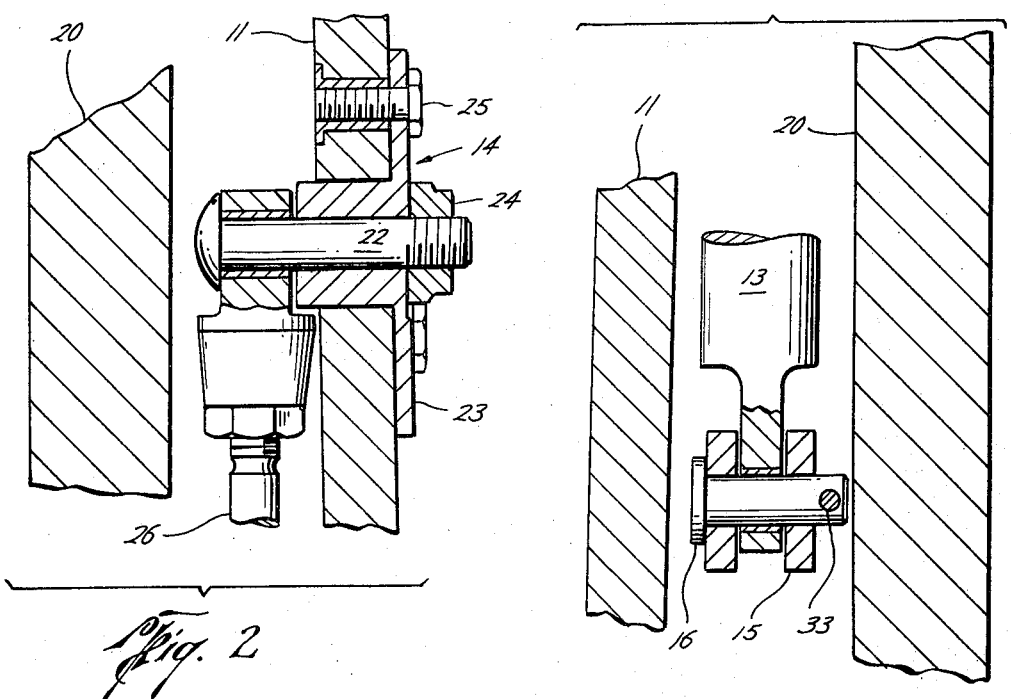
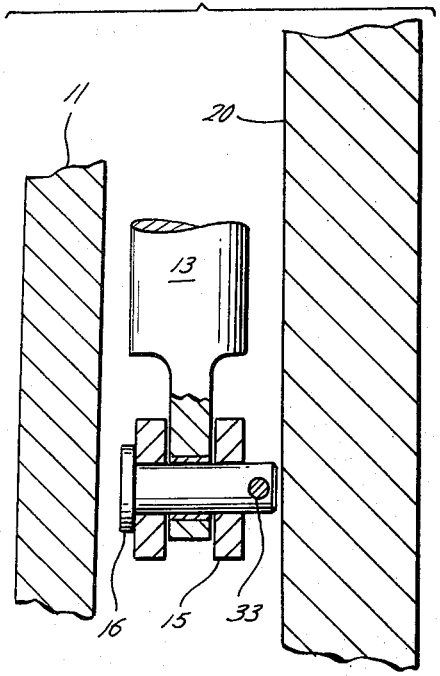
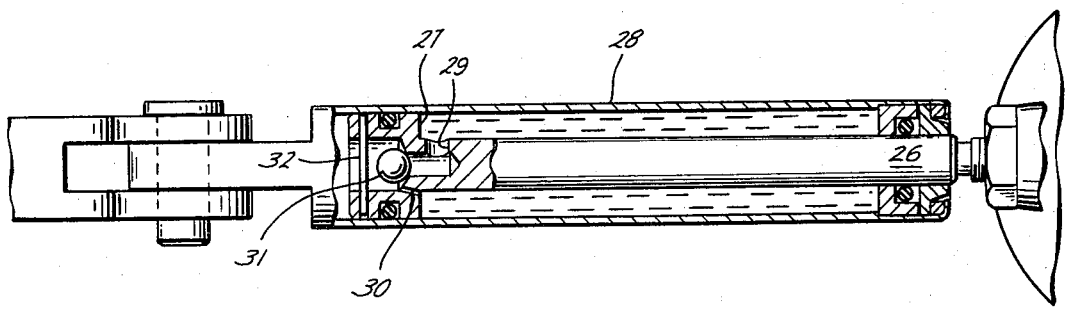

3,694,851

QUICKLY REMOVABLE, RETRACTABLE SNUBBED PIVOT PIN MECHANISM

This is a division of application Ser. No. 744,933, filed July 15, 1968 and now abandoned.

BACKGROUND OF THE INVENTION

Field of the Invention

This invention is classified in Class 16, Subclass 49, "Checks and Closures Hardware."

SUMMARY OF THE INVENTION

This invention pertains to a new and novel removable, snubbing pivot pin which may be utilized at each side of a storage bin and which may pivotally support the storage bin so that any and free downward tilting movement of the bin for access thereof is shock absorbingly controlled upon release of a suitable latch, for example, and the fully loaded bin is only allowed to slowly tilt to fully opened position. But, while downward opening movement is efficaciously snubbed, the bin may be closed or pivoted back to its original horizontal position with no appriciable resistance from the snubber.

Likewise, the storage bin is quickly removeable by mere inward pulling of knobs on the pivot pins for changing, cleaning, or repair of the storage bins.

Also is disclosed the quickly, retractable, and extendible snubbing pivot pin mechanism for forming a highly efficient pivot for incorporation with a storage bin, particularly one for aircraft passenger carry-on luggage, and for being mounted in a storage bin supporting structure, as in an aircraft passenger transport, adjacent the passengers.

Accordingly, the principal object of this invention is to provide a quickly removable, retractable, and snubbing pivot pin mechanism for mounting a bin in a cavity.

A further object of this invention is to provide a novel retractable pivot pin mechanism that may be used with a pivotal structure that makes the pivotal structure a quickly removable pivotal structure that may be pivotally connected to a support structure.

A still further object of this invention is to provide a new snubbing pivot pin mechanism that may be combined with a pivotal structure for forming a quickly and easily removable pivotal structure for pivotally mounting on a support structure with the means for snubbing the pivotal movement between the two structures.

Another main object of this invention is to provide a novel pivotal mount that may be utilized with a storage bin for providing a storage bin that is quickly removable, pivotal, and snubbed in its pivotal movement about its pivotal mount.

A still further object of this invention is to provide a new pivotal pin mechanism that may be combined with a storage bin for providing an aircraft passenger carry-on luggage storage bin pivotally mounted in an aircraft and being quickly and easily removable from the aircraft.

Other objects and various advantages of the disclosed quickly removable, retractable, snubbed pivot mechanism will be apparent from the following detailed description, together with the accompanying drawings, submitted for purposes of illustration only and not intended to define the scope of the invention, reference being had for that purpose to the subjoined claims.

BRIEF DESCRIPTION OF THE FIGURES

The drawings diagrammatically illustrate by way of example, not by way of limitation, one form of the invention wherein like reference numerals designate corresponding parts in the several views in which:

FIG. 2 is a sectional view taken at 2—2 on FIG. 1;

FIG. 3 is a side view of the snubber of FIG. 1, with parts in section;

FIG. 4 is a sectional view taken at 4—4 on FIG. 1; and

DESCRIPTION OF THE PREFERRED EMBODIMENT

Figure 1:
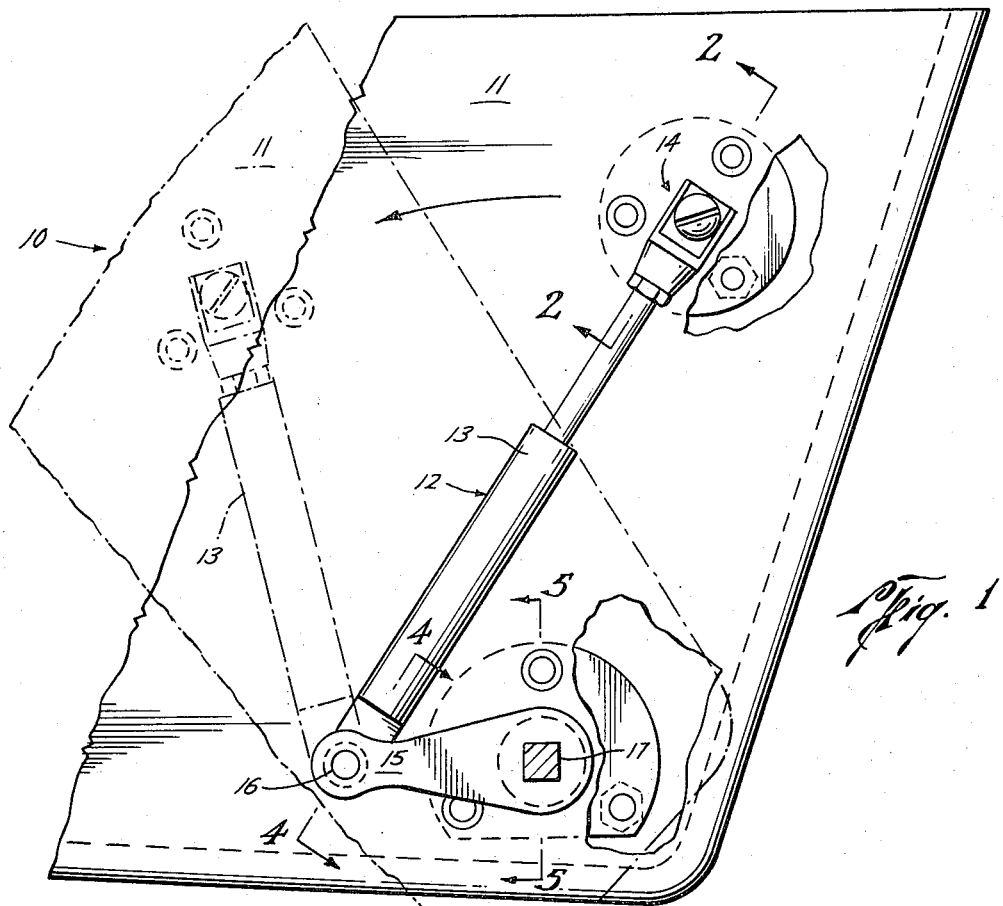
FIG. 1 is a side view, with parts in section, of the rear portion of the new storage bin shown in horizontal position in solid lines and in lowered unloading position in broken lines, the storage bin being shown with the quickly removable, retractable, and snubbed pivot pin mechanism connected thereto.

FIG. 1 illustrated, with parts in section for clarity of disclosure, a side view of the rear portion of the new and novel quickly removable, pivotal, and snubbed storage bin 10.

Pivotal bin 10, FIG. 1, comprises a storage bin 11 combined and mounted in a quickly retractable and snubbing pivot pin mechanism 12, one mechanism for each side. While each part of the two mechanisms are identical, each mechanism is the enantiomorphic analogue of the other.

Figure 5:
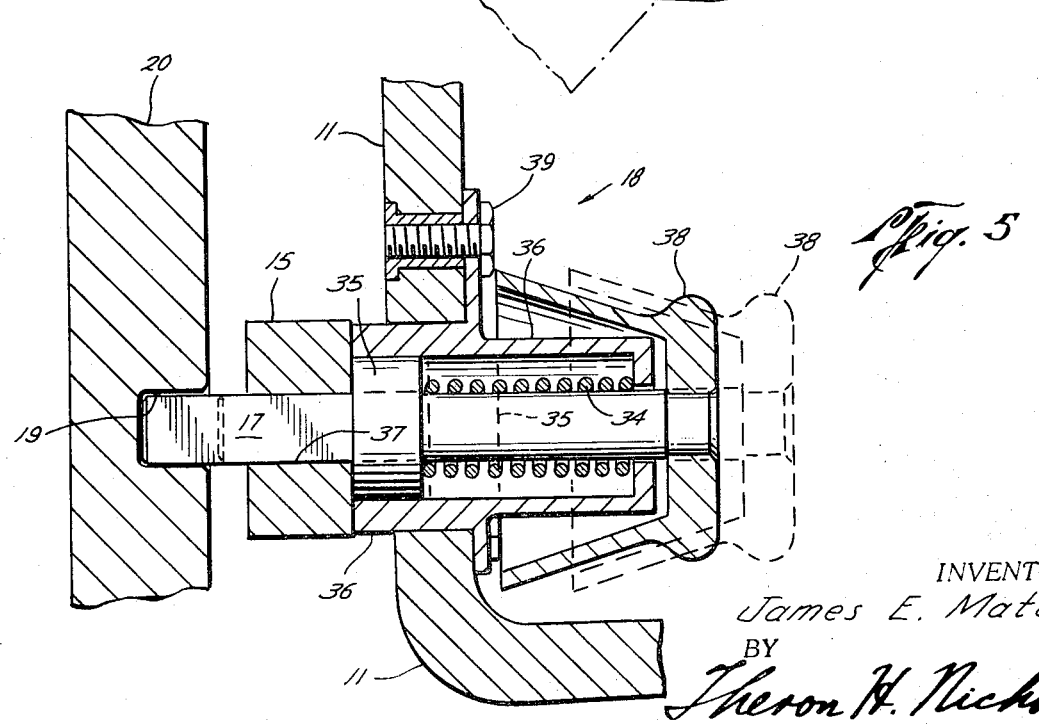
FIG. 5 is a sectional view taken at 5—5 on FIG. 1.

Each snubbing pivot pin mechanism 12, FIG. 1, comprises a snubber 13 pivotally connected at its upper end to the bin 11 with pivotal connection 14 and at its lower end to lever 15 with pivot pin 16. A shaft or pivot pin 17 or pivot pin device 18, FIG. 5, is nonrotatably but axially slideable in lever 15. From there the shaft or pivot pin 17 protrudes into a recess 19 in wall 20 of the bin supporting structure.

SNUBBER PIVOTAL CONNECTION 14

Pivotal connection 14 FIGS. 1 and 2, for connecting snubber 13, FIG. 1, to a side wall of the storage bin 11 comprises pivot pin or bolt 22, FIG. 2, passing through a hole in the upper end of a piston rod 26 of the snubber, through a flange 23, and retained with nut 24, the flange being secured to the bin wall with screws 25.

SNUBBER 13

Hydraulic snubber 13, FIGS. 1 and 3, comprises the piston rod 26, FIG. 3, actuatable by piston 27 slideable in cylinder 28. Piston rod 26 has a large orifice and passage 29 and small orifice 30 for fluid to pass from one side of the piston to the other. A ball 31 is retained internally of piston 27 by pin 32, the ball plugging the large orifice and passage when the fluid slowly flows to the right as the snubber is conpressed and shortened, as viewed in FIG. 3, whereas fluid flow to the left is fast and friction free as the piston rod extends.

FIG. 4, a section taken at 4—4 on FIG. 1, illustrates the pivotal connection of the lower end or cylinder 28, FIG. 4, of the snubber 13 and the left end of lever 15, FIG. 1, the latter being pivotally connected with pin 16, FIG. 4, passing through both and retained with locking pin or key 33.

PIVOT PIN DEVICE 18

FIG. 5, a section at 5—5 on FIG. 1 illustrates one of two pivot pin devices 18 of the overall snubbing pivot pin mechanism. Pin device 18 comprises a compression spring 34 around an intermediate portion of pin device shaft or pivot pin 17 compressed between an annular ridge 35 on the shaft and a wall surface internally of flange 36. The outer portion of shaft or pivot pin 17 is rectangular shaped and to the left of the ridge 35, FIG. 5, protruding from the flange 36, through a rectangular hole 37 in the lever 15, and terminating in the recess 19 in the bin supporting structure wall 20. The inner or right end of shaft or pivot pin 17 is round beginning with the annular ridge and extends internally of the bin to a round hole in the flange 36 and the shaft extends further therefrom the hole where a knob 38 is fixedly secured to the shaft inner end. Ridge 35, with its round outer surface, slideably actuates in a cylindrical cavity in the flange 36 enclosing the spring 34. Suitable belts 39 secure the flange 36 to a side wall of the bin 11.

Thus in operation of the pivot pin device 18, compression spring 34 spring urges in an axial direction the square end of pivot pin 17 out of its flange 36, through lever 15, and into bin supporting structure wall 20, whereby while pivot pin 17 is prevented from rotating, the storage bin 11 and flange 36 may freely pivot and rotate about the pivot 17. Inward manual pulling of the knobs 38 of both pivot pin devices on each side of the storage bin compresses spring 34 to permit inward movement of the pivot pins 17, to the left in FIG. 5, a distance of slightly over the depth of the recess 19 of the supporting structure wall 20, whereby the storage bin may be easily and quickly removed for cleaning, changing, repair, etc.

OPERATION OF THE QUICKLY REMOVABLE, PIVOTAL, AND SNUBBED STORAGE BIN

With a snubbing pivot pin mechanism 12 attached to both sides of the storage bin 11 at the rear thereof and with release of a latch (not shown) for supporting the front portion of the bin, the bin front portion immediately tends to drop down with all its weight to an accessible position for aircraft passengers, for example, to retrieve their belongings and/or store more luggage in the storage bin before raising it back to stored position.

As the bin drops, pivots, or rotates counterclockwise about the pivot pin 17, FIG. 1, which shaft is nonrotatably fitted in the supporting structure recess 19, the lever 15 is held stationary relative to bin support structure 20, and the snubber 13 contracts as it pivots about pivot pin 16, when the bin pivotal connection 14 moves toward pin 16 as it rotates about pivot pin 17 to the broken line position illustrated in FIG. 1. Contraction of the snubber 13 is resisted as the piston 27, FIG. 3, moves to the left, the ball plugs the large orifice and passage 29, and fluid flows only through small orifice 30.

Then when the storage bin is emptied or refilled and raised back up to the normal horizontal position, the snubber is easily extended with negligible resistance due to the snubber fluid passing through both the large orifice and passage and the smaller orifice in the piston as the snubber 13, FIG. 1, is actuated from the broken line position to the right to the solid line, horizontal position.

Thus it will be seen that the instant storage bin is quickly removable, pivotal, and snubbed in a manner which meets each of the objects set forth hereinbefore.

Having specifically described my invention, I so not desire to confine myself to the specific details of the constructional example herein whown and described as it is apparent that various modifications may be resorted to without departing from the broad principles of the invention as indicated by the scope of the following claims.

I claim:

1. A quickly removably, retractable, and snubbing pivot pin mechanism for mounting a bin in a cavity comprising,
    a. extendible pin means,
    b. snubbing means, and
    c. lever means nonrotatably and slideably connected to said extendible pin means and pivotally connected to said snubbing means.

2. A quickly retractable and snubbing pivot pin mechanism for retractably pivotally mounting a storage bin in a walled cavity comprising,
    a. an extensible pin being spring urged from said storage bin into a recess in an adjacent cavity wall,
    b. a lever having one end nonrotateably and slideably connected to said pin, and
    c. an elongated snubber, one end of said snubber being pivotally connected to the other end of said lever, and the other end of said snubber being pivotally mounted to the bin making said bin removably and pivotally mounted in said walled cavity and movement of said bin in said cavity is snubbed.

3. A snubbing mechanism as recited in claim 2 wherein,
    a. said elongated snubber extends freely when the storage bin is pivoted up into the walled cavity, and
    b. said elongated snubber generates a resistive force to compressive action thereof whereby the storage bin is allowed only to slowly tilt from the cavity to fully opened position.

4. A quickly retractable and snubbing pivot pin mechanism as recited in claim 2 wherein,
    a. said spring urged pin is retractable from said recess in the adjacent cavity wall by being moved against its spring urging, and
    b. said storage bin being responsive to said retracting movement of said extensible pin from said recess in the cavity wall for being quickly removable from the walled cavity.

5. A quickly retractable and snubbing pivot pin mechanism as recited in claim 2 wherein,
    a. an extensible pin is spring urged from each of two opposite sides on the storage bin into corresponding opposite recesses in the adjacent cavity walls,
    b. said extensible pins being retractable from their respective corresponding recesses by being moved against their spring urging, and c. said storage bin being responsive to said retracting movement of said pins from their respective recesses for being quickly removable from the walled cavity.

* * * * *